April 7, 1970 W. NYSTROM 3,505,655

DIGITAL STORAGE SYSTEM OPERATING IN THE MAGNITUDE-TIME DOMAIN

Filed June 21, 1968 2 Sheets-Sheet 1

INVENTOR
WALTHER NYSTROM
BY Kenneth R. Stevens
ATTORNEY

DIGITAL STORAGE SYSTEM OPERATING IN THE MAGNITUDE-TIME DOMAIN

Filed June 21, 1968 2 Sheets-Sheet 2

United States Patent Office 3,505,655

Patented Apr. 7, 1970

3,505,655

DIGITAL STORAGE SYSTEM OPERATING IN THE MAGNITUDE-TIME DOMAIN

Walther Nystrom, San Jose, Calif., assignor to International Business Machines Corporation, Armonk, N.Y., a corporation of New York Filed June 21, 1968, Ser. No. 738,939
Int. Cl. G11c *21/00, 27/00*
U.S. Cl. 340—173 5 Claims

ABSTRACT OF THE DISCLOSURE

A transforming means responsive to a digital input means generates a composite wave signal in the magnitude-time domain which is quantized by a sampling means and stored in an analog memory. Synthesizing means connected to the analog memory generates a reconstructed signal wave of the composite wave signal, and detection means responsive to the reconstructed wave signal provides a digital output in accordance with the magnitude-time characteristics of the reconstructed wave, and which digital output corresponds to the digital input previously stored in memory.

BACKGROUND OF THE INVENTION

The invention relates to an information storage system and more particularly to an information storage system wherein digital information is stored in an analog memory in a magnitude-time domain.

In the past, the failure of memory storage locations, such as magnetic core or capacitor means, resulted in a complete loss of bit information associated with that storage position. This is due to the fact that a single information bit is stored in a single physical location in memory. In order to alleviate this problem, numerous error checking schemes have been devised and generally fall under the heading of a duplicate memory approach. For example, it is possible to store a single bit in duplicate memory positions such that the occurrence of a failure in one bit position operates under appropriate control circuitry to read the information from a duplicate memory containing the same information. Thus, in memory systems which store a digital bit in a single digital bit position in memory, the duplicate memory approach, to some extent, has obviated the problems which arise by virtue of a defective memory position.

However, the duplicate memory approach does not lend itself to economical fabrication and testing of memories which are constructed by present day batch manufacturing techniques. Batch manufacturing of memory planes provides an extremely economical approach to the fabrication of memory systems. Obviously, batch production of memories coupled with a high output production yield is highly desirous. However, today it is often necessary or more economical to discard an entire memory plane due to a defective storage position. Thus, batch manufacturing of memory systems increases the economical advantages over prior art systems, but still contains many costly procedures and techniques by virtue of the fact that the memories are primarily employed to store a single bit position per physical location. Accordingly, the technique of employing duplicate memories although satisfactory to protect against failure of a physical memory bit position, suffers the disadvantages relating to the batch manufacturing of memory planes.

Accordingly, it is high desirous to employ a memory plane which is tolerant to random imperfection at each of the individual storage areas. A defect tolerant memory plane would greatly increase the output yield in the fabrication of such memories, and simultaneously reduce expenses and time in the testing of such a memory. However, a memory system which is tolerant to random imperfections is wholly unsuited to the storage of digital information in individual storage areas, as previously discussed.

Analog memories per se have been employed in the past, for example, thick walled ferrite memory cores as well as capacitive storage means have been used for this purpose. In this a system, an analog signal level, e.g. a voltage level, is stored in a single memory position. Furthermore, many forms of digital-to-analog converters in themselves are well known. But, it is readily apparent that the loss of analog information representative of a digital signal also causes the digital information associated with that analog value to similarly be lost. Thus, the mere storage of analog information in an analog memory also suffers the same disadvantages and problems which arise with respect to the storage of a single digital bit in one memory position, as previously discussed.

According to information theory, a continuously varying wave may be represented by discrete signals. Furthermore, the continuous wave may be reproduced exactly from a knowledge of its samples, provided the number of instantaneous samples per second exceeds twice its significant band-width occupancy in cycles per second. As applied to the present invention, the instantaneous samples per second must exceed twice the cycles per second of the highest frequency component present in the composite wave signal. Accordingly, it may be stated that if a signal represented in a magnitude-time function is sampled instantaneously at regular intervals and at a rate higher than twice the highest significant signal frequency present in the signal, then the samples contain all the information of the original signal.

A defect tolerant memory arises by virtue of the fact that if a composite wave is sampled at a significant number of points; the loss of a sampling point of discrete signal level due to random imperfections in the memory still leaves a sufficient number of samples for reproducing the waveform. An alternative approach is to view a single digital bit position as being represented by a plurality of discrete signal levels, and which signal levels are distributed over a plurality of positions in an analog memory. Thus, in contradistinction to conventional digital storage memory systems which store a single bit in a single physical location, the present invention allows the information contained in a single digital bit to be distributed over a plurality of storage areas. Of course, the greater number of samples which are taken result in greater accuracy, since more samples may be lost due to defects in a memory position without loss of information as long as a minimum number of samples remain, as determined by the highest frequency component present in the composite wave. Clearly, a feasible balance must be reached betwen the number of samples and the storage locations. Thus, accuracy must be balanced against maximum utilization of the memory locations.

It is an object of this invention to provide a reliable memory system which is tolerant to random imperfections.

It is a further object of the present invention to provide a storage system which distributes information representative of a single bit position into a plurality of discrete memory positions.

A further object of this invention is to store and retrieve digital information represented in a magnitude-time domain.

Another object is to improve production yields in the batch fabrication of memories.

SUMMARY OF INVENTION

The present invention relates to an information storage system which comprises a digital input means having bits of information connected to a transforming means which generates a composite wave signal having magnitude-time characteristics representative of the bits of input information. Sampling means quantize the composite wave signal into a plurality of discrete signal levels for storage into an analog memory. Synthesizing means responsive to the discrete signal levels in the analog memory generate a reconstructed wave of the composite wave signal. The reconstructed signal wave is applied to a frequency detection means for generating the bits of input information in accordance with the magnitude-time characteristics of the reconstructed wave.

The foregoing and other objects, features and advantages of the invention will be apparent from the following more particular description of preferred embodiments of the invention, as illustrated in the accompanying drawings.

DESCRIPTION OF PREFERRED EMBODIMENT

Figure 1:
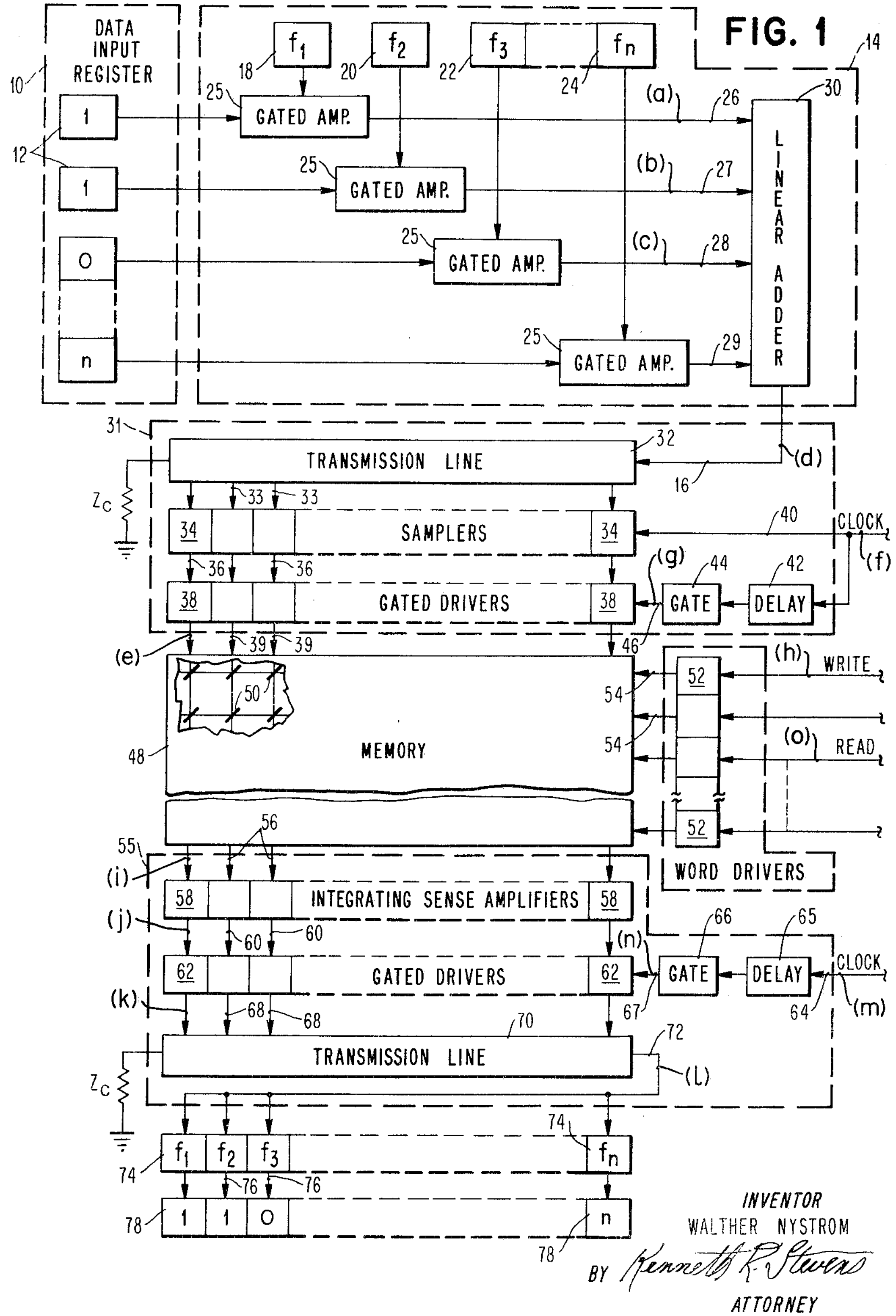
FIGURE 1 is a schematic diagram illustrating a preferred embodiment of the information storage system of the present invention.
Figure 2:
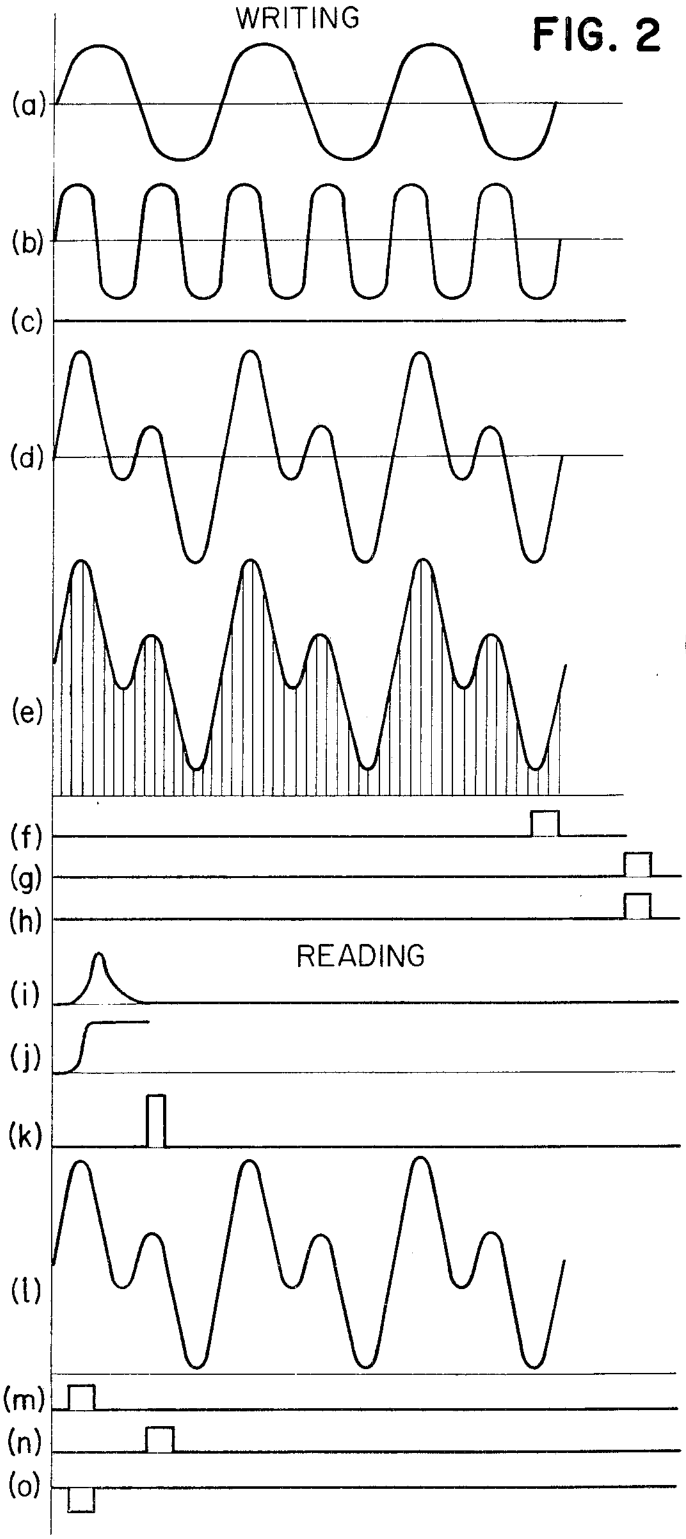
FIGURE 2 illustrates the waveforms at various locations of the circuit in FIGURE 1.

Now referring to FIGURES 1 and 2, a digital input means comprising a data register 10 receives bits of information in a plurality of bit positions 12. In order to transform the data input bits into a composite wave signal having magnitude-time characteristics representative of the input bits of information, the digital input means 10 is connected to a transforming circuit means 14 to generate a composite wave signal on an output line 16. The transforming circuit includes a plurality of frequency sources 18, 20, 22, and 24 each of which frequency sources generate signals of different frequencies, shown as $f_1$ through $f_n$. A plurality of gated amplifiers 25 are selectively gated in response to the bits in the digital input 10 so as to pass the individual frequencies $f_1$ through $f_n$ to a plurality of associated input terminals 26, 27, 28, and 29 on a linear adder 30. The linear adder 30 sums the individual signal frequencies received at its input and generates a composite wave signal at the output terminal 16.

Each of the frequency sources or oscillators 18, 20, 22, and 24 are normally individually tuned to generate irrational ratios between frequencies $f_1$ through $f_n$ in order to prevent noise problems that are caused by harmonics due to nonlinearities. However, rational frequencies ratios may be employed if non-linearity is not a problem.

In order to quantize the composite wave signal into a plurality of discrete signal levels, the output line 16 from the transforming means 14 is connected to a sampling means 31. The sampling means includes a transmission line 32 connected at its input to the line 16 and terminated by its characteristic impedance $Z_c$. A plurality of output lines 33 from the transmission line 32 connects to a plurality of individual sampler circuits 34 which in turn are connected by a plurality of output sampler lines 36 to a plurality of conventional gated drivers 38. Discrete signal levels, as illustrated by waveform (*e*) in FIGURE 2, are passed to a plurality of output lines 39 from the gated drivers 38 under synchronization of a clock pulse (*f*), also shown in FIGURE 2.

The transmission line 32 is sampled at discrete intervals along its entire length by the plurality of conventional sampler circuits 34, which have a high input impedance in order to eliminate loading of the transmission line 32. The plurality of samplers 34 are read by a clock pulse (*f*) applied to a line 40. The duration of the clock pulse applied to line 40 is short compared to the period of the highest frequency component of the composite wave signal applied to the transmission line 32 via the connection 16. Accordingly, each sampler 34 holds the instantaneous voltage of a point on the transmission line 28 at a time determined by the clock pulse (*f*) applied to the line 40.

The gated drivers 38 are of conventional design and are each simultaneously gated by a pulse (*g*) formed by applying the clock pulse (*f*) to a delay circuit 42 which in turn connects to a gate 44 having an output line 46.

The delay circuit 42 connected to the line 40 is necessary in order to allow the plurality of gated drivers 38 to build up to a sufficient voltage or potential in response to input signals applied at the plurality of lines 36. The time delay essentially amounts to the transition time period of the gated drivers. Additionally, in the preferred embodiment it has been found that better results are achieved if the composite wave signal (*d*) is converted to a unipolar signal prior to storage. This is readily accomplished in a well known manner by appropriately biasing the gated drivers 38 in order to obtain a unipolar waveform (*e*) at the plurality of lines 39.

Figure 3A:
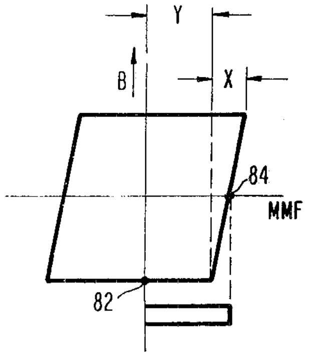
FIGURES 3(*a*) and 3(*b*) illustrate a thick walled ferrite core and its electrical characteristics, and represents one embodiment which may be employed as a storage element in the analog memory of FIGURE 1.
Figure 3B:
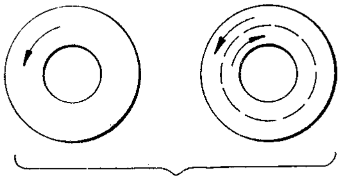

Conventional word selection and drive is employed to write the discrete signal levels into an analog memory 48 having a plurality of discrete storage position 50, and which storage positions are described in greater detail below with reference to FIGURES 3(*a*) and 3(*b*).

A plurality of conventional word drivers 52 connect to the analog memory 48 for providing control signals to selectively write and read said discrete signal levels into and out of the storage areas 50. Write and read pulses, illustrated in FIGURE 2 as pulses (*h*) and (*o*), respectively, generate control signals which are applied to a plurality of input lines 54 connected to the memory 48. In one mode of operation, the pulses (*g*) and (*h*) are in time coincidence so as to condition the memory 48 to simultaneously receive the discrete voltage levels applied to the lines 39, that is, the gated drivers 38 and the word drivers 52 are synchronized to provide simultaneous storage of the discrete signal levels into the memory 48.

In order to form a reconstructed signal wave of the composite wave signal in accordance with the discrete signal levels stored in the plurality of storage areas 50, a synthesizing circuit means 55 is connected to the analog memory 50 by way of a plurality of connections 56. The synthesizing circuit 55 includes a plurality of integrating sense amplifiers 58 of conventional design, each of which generate a signal on their respective output lines 60, which in turn provides input signals to a plurality of gated driver circuits 62. Since the output from the memory 48 is fed to integrating amplifier means 58, the individual output signals on line 60 represent a signal corresponding to the total flux stored in the discrete storage positions 50, as opposed to conventional readout circuitry which would provide a signal which actually was a measure of the change of flux with respect to time.

The plurality of gated drivers 62 are each individually driven in response to a clock pulse (*m*) applied to a line 64 which connects to a delay circuit 65, and then to a gate circuit 66 in order to generate a pulse (*n*) on a line 67, and which pulse (*n*) is applied to each of the gated drivers 62. As previously discussed, a write pulse (*o*) and a clock pulse (*m*) are appropriately synchronized, as shown in FIGURE 2, such that the time delay created by the delay circuit 65 allows the voltage on the driver input lines 60 to build up to an appropriate level necessary due to the transition period of the gated drivers themselves.

A plurality of output lines 68 from each of the gated drivers 62 simultaneously apply their respective signal levels, one of which is shown as waveform (*k*) in FIGURE 2, to a transmission line 70 which is terminated in its characteristic impedance $Z_c$. The transmission line 70 which connects to the integrating sense amplifiers operates to combine the absolute signal levels present on the line 68 so as to form a reconstructed wave signal. The reconstructed wave signal is shown in FIGURE 2 as waveform (*l*) and contains magnitude-time characteristics representative of the bits of information stored in the digital input register.

In order to generate bits of information in accordance with the magnitude-time characteristics of the reconstructed wave signal (*l*), a detection circuit is connected to a fan-out terminal 72 from the transmission line 70. The line 72 provides parallel input signals to a plurality of frequency discriminators or detectors 74, each of which is selectively responsive to a predetermined frequency and indicated on the drawing as $f_1$ through $f_n$. Output connections, shown generally at 76 from the detectors 74 each individually feed respective bit positions in an output data register 78.

Regular thick walled ferrite memory cores are particularly well suited for this analog mode of storage. Now referring to FIGURES 3(*a*) and 3(*b*) which illustrate a B–MMF curve or loop for a thick walled ferrite memory core. If the core is in a state illustrated by point 82 as a result of magnetizing current as shown in the left-hand portion of FIGURE 3(*b*), and is brought to the partial state as indicated by point 84; the change in magnetization will be as shown in the right-hand portion of FIGURE 3(*b*). This state is stable for all amplitudes less than that of the write current (*h*). Thus the core is not disturb sensitive in its partial state, provided the magnetization force X is less than Y, as shown in FIGURE 3(*a*). Although the present invention has been described in terms of a ferrite core, it is to be understood that capacitive or other analog memory storage elements are also suitable within the scope of the present invention.

OPERATION

For purposes of illustrating the present invention, it will be assumed that digital one levels are stored in the first two register positions while a digital zero level is stored in the third position. The gater amplifiers 25 are gated to an open position in response to a digital one level. Accordingly, the waveforms or signals illustrated as (*a*) and (*b*) and generated by their respective frequency oscillators 18 and 20 are applied to the linear adder 30. Since a zero or down level is contained in the third bit position, its associated gated amplifier is closed and therefore no $f_3$ signal is applied to the linear adder. The linear adder sums the various input signals and produces an output which is applied to the transmission line 32. Waveform (*d*) in FIGURE 2 represents the linear addition of waveforms (*a*) and (*b*).

Under control of a clock pulse applied to line 40, the plurality of samplers 34 sample the composite wave signal on the transmission line 28 in a conventional manner. The gated drivers 38 are gated on by a delayed pulse (*g*) applied at line 46 after a predetermined time delay which allows the gated drivers to build up to the voltage level being applied at its input on lines 36. Also, the gated drivers are biased in a conventional manner such that the composite waveform (*d*) is transformed into a unipolar signal, as illustrated in waveform (*e*).

Thus, each of the discrete signal levels as illustrated in waveform (*e*) is stored in individual memory locations 50. As previously discussed, a write pulse (*h*) operates in synchronism with pulse (*g*) to simultaneously store or write the discrete signal levels into the analog memory. Up to this point, the composite wave signal has been quantized into discrete signal levels with the results stored in memory.

In order to generate a reconstructed wave signal corresponding to the composite wave signal a read pulse (*o*) is applied to the appropriate word driver 52. A signal in the nature of that illustrated at (*i*) is read from each one of the lines 56. In order to obtain a measurement of the total signal stored in the individual locations 50, each of the signals are integrated by the integrating sense amplifier means 58 so as to generate a signal at each of its output terminals 60 in the nature of that illustrated at (*j*). It is readily apparent that the signal (*j*) is a measure of the absolute signal which was stored in each memory location 50, as opposed to a signal which represents a change of flux with respect to time. Again, it is noticed that the gate pulse (*n*) is delayed a predetermined amount from the read pulse (*o*) before being applied to each of the gated drivers 62, so as to allow the gated drivers an opportunity to build up to the desired potential in response to a voltage level on the lines 60.

Each of the gated drivers 62 generates a voltage pulse having a predetermined level and illustrated by waveform (*k*). The individual pulses on lines 68 are then injected into the transmission line 70 at predetermined points along its length. The cumulative effect is to form a reconstructed wave signal, as shown at (*l*), which propagates in two directions along the transmission line, one into a characteristic impedance $Z_c$ of the transmission line and the other into a fanout driver feed 72. Thus, the integrating sense amplifiers, gated drivers, transmission line 70, and the appropriate synchronizing signals operate as a synthesizing means which generates a reconstructed signal wave of the composite wave signal in accordance with the discrete signal levels that were stored in the analog memory 50.

The reconstructed wave signal is then fed to frequency detectors 74 which are tuned to generate an up level in response to a predetermined frequency. In the illustrated examples, the frequency detector associated with frequency $f_1$ is responsive only to a signal having a frequency of that shown by the waveform (*a*), and likewise the frequency detector associated with $f_2$ to that shown in (*b*), etc. Accordingly, the output data register 78 is responsive to the frequency detectors for storing bits of information in accordance with the magnitude-time characteristics of the reconstructed signal wave, and which of course correspond to the bits of information originally stored in the digital input means.

By deliberately assigning the lower frequency component to the most significant bit in the digital input greater reliability is obtained. Since the lower frequency component signals which go into making up the composite wave signal are sampled a greater number of places within its wavelength for a given sampling frequency, a greater number of discrete signal levels within its wavelength are stored in the analog memory for that particular digital bit. By virtue of this fact, sufficient samples remain to reproduce the reconstructed waveform, even if certain levels are lost due to physical failure of a memory location. In this manner, it is extremely unlikely that an error will occur in the more significant bit of the digital word.

While the invention has been particularly shown and described with reference to preferred embodiments thereof, it will be understood by those skilled in the art that various changes in form and details may be made therein without departing from the spirit and scope of the invention.

What is claimed is:

1. An information storage system for storing a representation of a digital bit over a plurality of locations comprising:

(a) a digital input means having bits of information therein, (b) transforming means connected to said digital input means for generating a composite wave signal having magnitude-time characteristics representative of said bits of information, (c) a sampling means connected to said transforming means for quantizing said composite wave signal into a plurality of discrete signal levels, (d) an analog memory having a plurality of storage areas, said storage areas connected to said sampling means for receiving said plurality of discrete signal levels, (e) means connected to said analog memory for providing control signals to selectively write and read said discrete signal levels into and out of said analog memory, (f) synthesizing means connected to said analog memory for generating a reconstructed signal wave of said composite wave signal in accordance with said discrete signal levels stored in said plurality of storage areas, (g) said reconstructed wave signal having magnitude-time characteristics representative of said bits of information, and (h) detection means connected to said synthesizing means for generating said bits of information in accordance with the magnitude-time characteristics of said reconstructed wave signal, (i) said information storage system providing errorless output information in a defect tolerant mode.

2. An information storage system for storing a representation of a digital bit over a plurality of locations as in claim 1 wherein said transforming means further includes:

(a) a plurality of freqency sources for generating signals of different frequencies, (b) an adder having input terminals for combining said signals of different frequencies, and (c) means responsive to said bits of information for selectively gating said signals of different frequencies to said adder input terminals.

3. An information storage system for storing a representation of a digital bit over a plurality of locations as in claim 2 further including a sampling line connected to said sampling means for receiving a sampling signal for quantizing said composite wave signal at intervals which are shorter than half the wavelength of the highest frequency component present in said composite wave signal.

4. An information storage system for storing a representation of a digital bit over a plurality of locations as in claim 2 wherein:

(a) said synthesizing means further includes a plurality of sensing means for generating a plurality of absolute signal levels, and (b) means connected to said plurality of sensing means for combining said absolute signal levels to form said reconstructed wave signal.

5. An information storage system for storing a representation of a digital bit over a plurality of locations as in claim 4 wherein:

(a) said detection means further includes a plurality of frequency detectors each of which is selectively responsive to a frequency which corresponds to a frequency generated by one of said plurality of frequency sources.

References Cited

UNITED STATES PATENTS 3,368,203 2/1968 Loizides ____________ 340—172.5

TERRELL W. FEARS, Primary Examiner

U.S. Cl. X.R.

340—146.1, 172.5